United States Patent
Griego et al.

(10) Patent No.: US 6,890,412 B2
(45) Date of Patent: May 10, 2005

(54) ELECTRODEPOSITION APPARATUS AND METHOD USING MAGNETIC ASSISTANCE AND ROTARY CATHODE FOR FERROUS AND MAGNETIC PARTICLES

(75) Inventors: Thomas P. Griego, Corrales, NM (US); John W. Eichman, III, Grants, NM (US); Geronimo Velasquez, Albuquerque, NM (US)

(73) Assignee: Surfect Technologies, Inc., Albuquerque, NM (US)

( * ) Notice: Subject to any disclaimer, the term of this patent is extended or adjusted under 35 U.S.C. 154(b) by 0 days.

(21) Appl. No.: 10/228,709

(22) Filed: Aug. 27, 2002

(65) Prior Publication Data

US 2003/0038034 A1 Feb. 27, 2003

Related U.S. Application Data

(60) Provisional application No. 60/315,502, filed on Aug. 27, 2001.

(51) Int. Cl.[7] .............................................. C25D 5/00
(52) U.S. Cl. ...................... 205/89; 205/90; 205/109; 205/143; 205/119; 204/155; 204/212; 204/242; 204/273
(58) Field of Search ................. 204/155, 212, 204/242, 273; 205/89, 90, 109, 143, 119

(56) References Cited

U.S. PATENT DOCUMENTS

| | | | |
|---|---|---|---|
| 4,201,635 A | | 5/1980 | Müller |
| 4,465,264 A | | 8/1984 | Lin |
| 4,666,568 A | | 5/1987 | Dash |
| 5,312,532 A | * | 5/1994 | Andricacos et al. ..... 204/229.4 |
| 5,421,987 A | * | 6/1995 | Tzanavaras et al. ........ 205/133 |
| 5,428,331 A | | 6/1995 | Graner et al. |
| 5,487,824 A | | 1/1996 | Griego |
| 5,565,079 A | | 10/1996 | Griego |
| 5,879,520 A | | 3/1999 | Griego |
| 6,251,250 B1 | * | 6/2001 | Keigler ......................... 205/89 |
| 6,274,022 B1 | * | 8/2001 | Asai et al. ..................... 205/89 |

* cited by examiner

*Primary Examiner*—Wesley A. Nicolas
(74) *Attorney, Agent, or Firm*—Jeffrey D. Myers; Peacock, Myers & Adams, P.C.

(57) ABSTRACT

A method and apparatus for microencapsulating or electrodeposited coating of ferromagnetic and soft-magnetic sub-micron or nano sized powderized material comprising use of a rotary flow-through device assisted by an electromagnet within the electrode ring to alternately position the powder at the face of the cathode ring and electroplate the powder and reorient it prior to another repositioning. The invention is also of a process and apparatus for forming a strip, mesh, or film from magnetic powderized material in an organized bipolar arrangement, which is particularly useful for electroforming foils with the magnetic particles positioned in a monolayer within a multilayer metallic foil.

18 Claims, 9 Drawing Sheets

ELECTRODEPOSITION APPARATUS AND METHOD USING MAGNETIC ASSISTANCE AND ROTARY CATHODE FOR FERROUS AND MAGNETIC PARTICLES

CROSS-REFERENCE TO RELATED APPLICATIONS

This application is a continuation of international application No. PCT/EP01/01129 filed on Feb. 2, 2001, which claims priority of German patent application No. 100 05 195 filed on Feb. 5, 2000.

This application claims the benefit of the filing of U.S. Provisional Patent Application Ser. No. 60/315,502, entitled "Electrodeposition Apparatus and Method Using Magnetic Assistance and Rotary Cathode for Ferrous and Magnetic Particles", filed on Aug. 27, 2001, and the specification thereof is incorporated herein by reference.

BACKGROUND OF THE INVENTION

1. Field of the Invention (Technical Field)

The present invention relates to apparatuses and methods for electroplating and electrochemically modifying the surface finish of ferrous and magnetic powders, particularly by continuous magnetically assisted centrifugal means for encapsulation, and electrodeposition on powders without limitation on particle size, but specifically including submicron- or nano-sized particles.

2. Background Art

The technologies for electrochemical enhancement of the surfaces of the particles in bulk powders has previously been limited to two main types: chemical copper and electrolytic nickel auto-catalytic processes; and rotary electroplating devices which require frequent stopping and starting of the electrolytic cell's rotation to tumble the powder to achieve uniform dispersion of the coating upon the particles. A limitation of the previous art using chemical or auto-catalytic processes is the cost of the chemical consumption due to the enormous surface areas of powders. Another limitation of known devices using the rotary techniques is the need to stop the cell to tumble the powder in order to disperse the coating and prevent agglomeration of the particles. Known devices of the latter type known in the art are typified by the disclosure of U.S. Pat. No. 5,879,520, the teachings of which are hereby incorporated by reference. Further background in the field of rotary flow-through electroforming/electrodeposition devices and methods is supplied by U.S. Pat. Nos. 5,487,824 and 5,565,079, the disclosures of which are hereby incorporated by reference.

Previous rotary flow-through devices are capable of centrifugal clarification of the particles in solution and fixing them against the cathode ring for electrical contact. A disadvantage occurs, however, when rotation of the cell must be stopped to tumble the powder particles to foster even electrodeposition upon the individual particles. During this "stop phase," the particles are re-suspended in the electrolyte solution. If the particles are of sufficient density, continuing the rotation of the cell re-clarifies the solution and again fixes the particles against the electrical contact ring, but the need periodically to stop and re-start cell rotation prolongs total processing times. But very significantly, in the case of submicron-sized, low mass powders, the method of repeatedly stopping and resuming cell rotation is unacceptable from a practical standpoint, because the material particles remain in suspension (rather than in contact with the cathode) for impermissibly, nearly indefinite, lengths of time.

Each time the cell rotation is resumed (after stopping to tumble the substrate powder), time is required to clarify the solution and re-fix the particles to the face of the cathode ring; heavier particles are thrown into renewed contact with the cathode first, while finer particles require comparatively more time to move outward under centrifugal force. This results in heavier particles having preferential electrical contact with the cathode, resulting in a wide variance in the uniformity of the thickness distribution. In many cases, ultrafine particles will receive no electrodeposition at all.

SUMMARY OF THE INVENTION (DISCLOSURE OF THE INVENTION)

The invention is a continuous rotary flow-through electrodeposition system including a vertical rotating cell. The system has a plurality of nozzles and electrodes alignable concentrically to the rotating cell. The cell includes a generally annular electrode ring on the wall of the cell vessel. The rotating cell preferably features a generally toroidal magnet, or annular magnet array (permanent magnets or preferably electromagnetic coil) disposed within the annular electrode (cathode) in the vessel. This innovation promotes catalytic efficiency.

The cell is provided with a catch basin and a canopy that catch flow-through electrolyte for return to the solution reservoir.

The present invention can also be used with or without a sintered membrane or laser cut slots to allow solution to flow-through, since the cell is configured to permit overflow of process solution from the top port thereof without discharging therewith the powder material being treated. Further, the present invention is operated, in phase with stop and start rotation cycle of the cell. This provides an efficient method of positioning the particles on the electrode surface during process. The electromagnet is energized in sequence to the cell start of the rotation cycle and then de-energized during the stop phase to allow the metal powder to re-suspend and achieve dispersion of the deposit. The stop and start rotation cycle is repeated at high frequency with each cycle assisted by the electromagnet attracting the fine particles to efficiently clarify the suspended powder and prevent the discharge of metal powder from the cell. After a chemical is applied and the electrodeposit is achieved the next step is to recover the electrolyte solution and retain the electroplated powder for further process steps such as rinsing. This is done by continuously energizing the electromagnet during the purge and fill cycles as a sequence of chemicals and rinse water is applied during the multi-step electroplating process. FIG. 9 illustrates the sequence of on/off events for the process cycle during both the electrodeposition process and the chemical change sequence.

The following process sequence is typical for a single or multilayer electrodeposition of metal from standard electroplating solutions:

1. Load powder into cell.
2. Rinse with electromagnet ring energized.
3. Use high speed rotation to purge rinse water with electromagnetic ring energized.
4. Insert anode into cell and inject electrolyte solution with electromagnetic ring energized.
5. Operate cell with start/stop cycle described above and sequenced switching of the electromagnetic ring until the required amp minutes are accumulated.
6. Use high speed purge rotation with electromagnetic ring energized to remove the electrolyte and retain the electroplated powder.

7. Spray or flow deionized water into cell with electromagnetic ring energized to rinse the remaining electrolyte solution while retaining the powder in the cell. Repeat as necessary.

8. Use high speed purge rotation with electromagnetic ring energized to remove the electrolyte and retain the electroplated powder.

9. Repeat the electroplating steps to add another deposit or other process steps such as etch or passivation.

10. Circulate with electromagnetic ring energized and inject hot air or Nitrogen to dry the powder in the cell.

A primary object of the processes of the invention is to provide effective electrolytic microencapsulation of submicron-sized or "nano scale" ferromagnetic or soft magnetic particles.

A primary object of the apparatus of the present invention is to permit the multi-step electroplating process without physical transfer of the plating fixture or cumbersome manual filtered exchange of solutions.

A primary advantage of the invention is that it can process submicron-sized materials with high efficiency, with or without a sintered membrane or slotted dome.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 1:
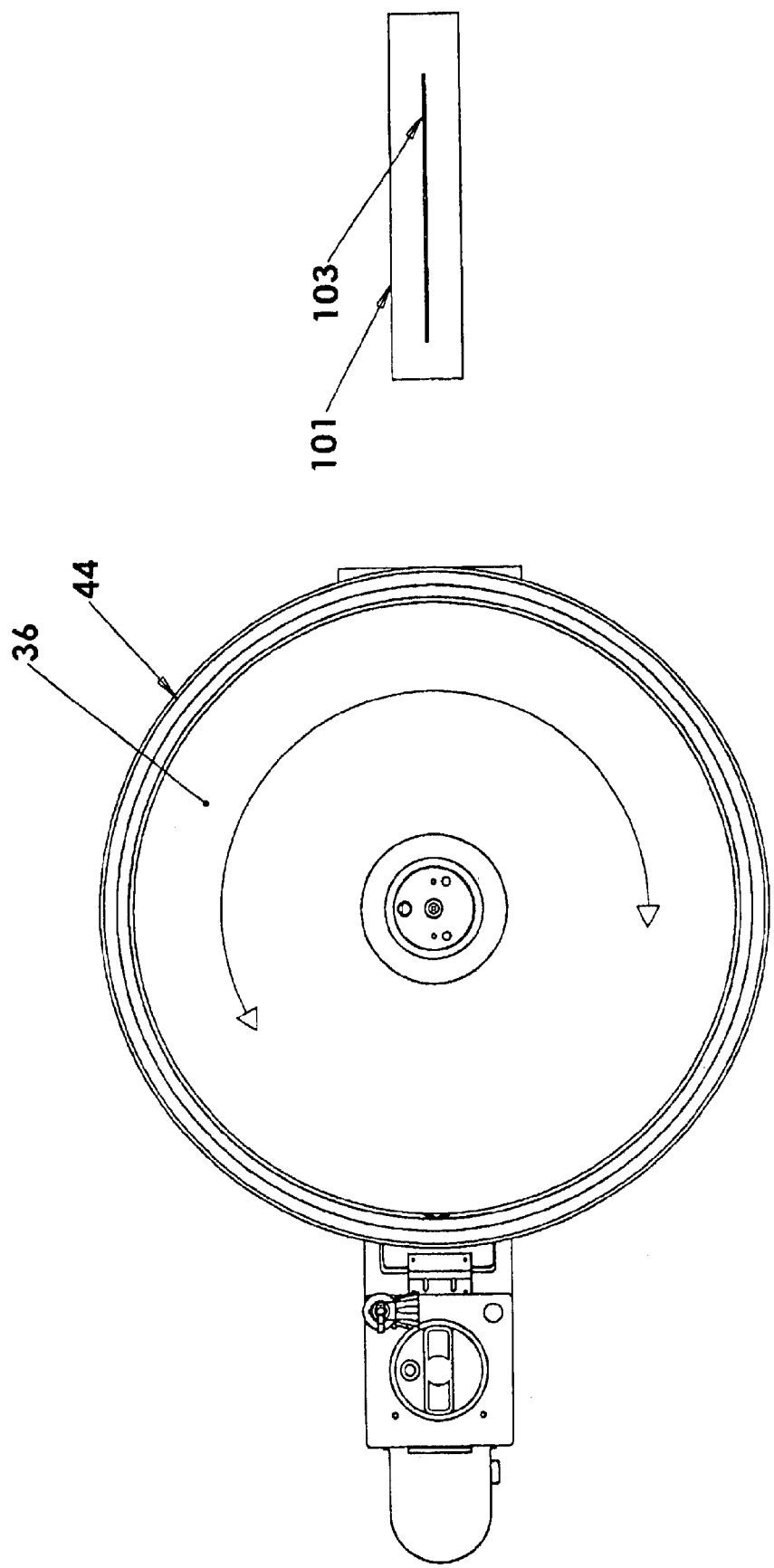
FIG. 1 is a top plan view of a preferred embodiment of the apparatus of the invention.

Best Modes for Carrying Out the Invention

The present invention offers major improvements to apparatuses and methods in electrolytic cell technologies for microencapsulating or coating powdered materials. The apparatus of the invention incorporates some of the desirable aspects of devices and processes known in the art, such as multiple return drains and multiple selectable feed nozzles, while yet overcoming various disadvantages manifested in previous efforts.

The present invention capitalizes upon the fundamental concept of harnessing centrifugal force to compact bulk materials, particularly submicron- or nano-sized powders, in solution or suspension (preferably aqueous) against an electrolytic cathode contact. Throughout this disclosure, "substrate material" or "substrate powder" refers to the bulk materials to be treated, and specifically includes but is not limited to super-fine ferrous and magnetic powders having mean particle diameters in the nanometer or submicron range.

The central component of the apparatus is the cell, which features an upper dome mounted upon a bowl. The substrate material is loaded through a top opening in the cell, and the plating cell is rotated at sufficiently high rpm to centrifugally throw the substrate material against the cathode contact at the outer perimeter of the cell and is assisted by the electromagnetic ring to improve efficiency for handling sub-micron ferromagnetic materials such as iron, nickel cobalt and other alloys with soft magnetic properties. Electroplating solution is then introduced at the top opening, and flows through the cell, eventually exiting through a filter disposed between the dome and the top edge of the bowl, or alternatively by overflowing at the top opening of the cell. A key advantage of the present invention is that the cell containing the electroplating solution and the substrate material incorporates an annular magnet, preferably an electromagnet, the magnetic force of which draws the particles toward the cathode, thus increasing the efficiency of the device by, among other things, reducing significantly the duration of the "stop" stage of the stop-start method. The invention therefore improves dramatically on the known stop-start and sequential switching methodologies to circulate the particle position for even coverage and prevention of agglomeration/bridging of the substrate material. Thus, in marked contrast with prior devices, the magnetically assisted cathode of the present invention results in the efficient movement and controlled agitation of the substrate material in the cell.

The overall and general configuration of a preferred embodiment of the constant rotary flow-through plating apparatus according to the invention is illustrated in FIGS. 1–8. Principal components of the invention include a rotational drive shaft 20, upon which the cell is disposed, the shaft 20 and cell both being disposed concentrically with and above a rotatable drain basin 24. A motor and drive shaft are used to rotate the cell generally according to convention. Bearings may provide for smooth rotatable disposition of the cell. The cell rotates about its vertical axis A, which is coaxial with the shaft 20. The cell includes a constant flow-through bowl assembly 36 rotatable about the axis A. As mentioned bowl bearings smooth and ease the rotation of the cell bowl assembly 36. An annular electrode 44 as a, in typical usage serving as a cathode, is mounted in the bowl assembly. An anode assembly 50 is mounted upon a movable boom according to known construction, so that the anode assembly is controllably movable between a use position immersed in solution within the bowl assembly 36 and a retracted position exterior thereof. The upper circumferential rim or edge of the basin 24 is in sealed, but removable, contact with the lower circumferential rim of a closed overarching, e.g., generally hemispherical, canopy 38, so that the combination of the shaft 20, basin 24 and canopy 38 substantially surround and enclose the platen 30 and bowl assembly 36.

In this disclosure, reference is made to an "anode" assembly and to "cathode" contact strips. It is immediately understood by one of skill in the art that the electrochemical roles of the electrodes in an electrolytic cell may be reversed according to the type of electrolysis to be performed. Thus, in every cell there is a primary electrode and an opposing electrode, and which of the pair functions as the anode and which serves as the cathode may be selectively determined by the operator to perform the desired electrolytic process within the cell. Thus, while the electrode 50 movable upon an overhead boom in this disclosure is denoted as an "anode," it may actually serve as a cathode in various alternative embodiments or processes without departing from the scope of the invention. Likewise, the annular "cathode" 44 may in alternative applications function as an anode. Further, the anode 50 may be either soluble or insoluble according to know principles in the art, depending upon the specific electrolytic process to be performed.

The placement of the anode 50 upon an adjustable boom permits the anode or anode assembly to be controllably disposed into the cell for immersion into the electrolyte, and then controllably withdrawn to a position exterior of the cell. Thus, the anode 50 is positionable outside the bowl assembly 36 so as not to be within the cell during, for example, post- or non-electrolytic processing steps, such as rinsing. Further, a multi-anode assembly may be provided, wherein one type of anode may be withdrawn, and another controllably disposed in its stead, to perform a series of process steps in the cell using different anode types.

A specialized dome 40 is mounted upon and above the bowl assembly 36, with an annular filter 42 disposed between and in sealed contact with the lower circumferential rim of the dome 40 and the rim of the bowl assembly 36. The bowl assembly 36 and dome 40, together with the anode assembly 50, collectively are the principal elements of the electrolytic cell of the invention. The drain port 26 of the basin 24 is locatable above the inlet of a solution reservoir 80, which may be any one of a plurality of solution reservoirs disposed radially about the exterior of the drain basin 24. Solution from within the reservoir 80 may be pumped into the bowl assembly 36, via one or more feed nozzles 83, by means of a suitable pump 81 and re-circulation conduit 84.

The flow of working solution through the apparatus of the invention during any given treatment cycle is described with reference to FIGS. 1 and 2. At the outset of operation, with the substrate material previously disposed inside the bowl assembly 36, the re-circulation conduit 84 is connected with the discharge port 85 of a selected solution reservoir 80 containing the first solution or liquid of interest (e.g., a pre-rinse, perhaps de-ionized water). Solution is then pumped by the pump 81, via the discharge port 85, from the reservoir 80 through a filter and then the re-circulation conduit 84 to the feed nozzles 83 and into the bowl assembly 36, until the desired solution level in the bowl assembly is attained. An advantage, therefore, is the re-circulation of filtered treatment solution, improving process efficiency without demanding fluid restocking with new, unused solution. The driving mechanisms of the apparatus are actuated to rotate the bowl assembly 36, and the centrifugal force from the bowl assembly's rotation casts the substrate material against an arcuate segment of the inside wall of the bowl assembly in a manner to be further described. The working solution likewise is urged toward the inside wall of the bowl assembly 36 (where the intended electrolytic processes occur), and tends to flow under centripetal force up to the point of maximum cell diameter, i.e. the annular juncture of the bowl assembly 36 with the dome 40. An annular osmosis filter 42 is situated at the juncture between the rim of the dome 40 and the rim of the bowl assembly 36. The solution then is forced through the osmosis filter 42, and is free to flow by gravity down the exterior bowl skirt 73 and/or the inside surface of the canopy 38 to be collected in the bottom of the drainage basin 24. Recovered solution may then be released through the drain port 26 for return to the solution reservoir 80 for re-use or reclamation, as desired.

Figure 2:
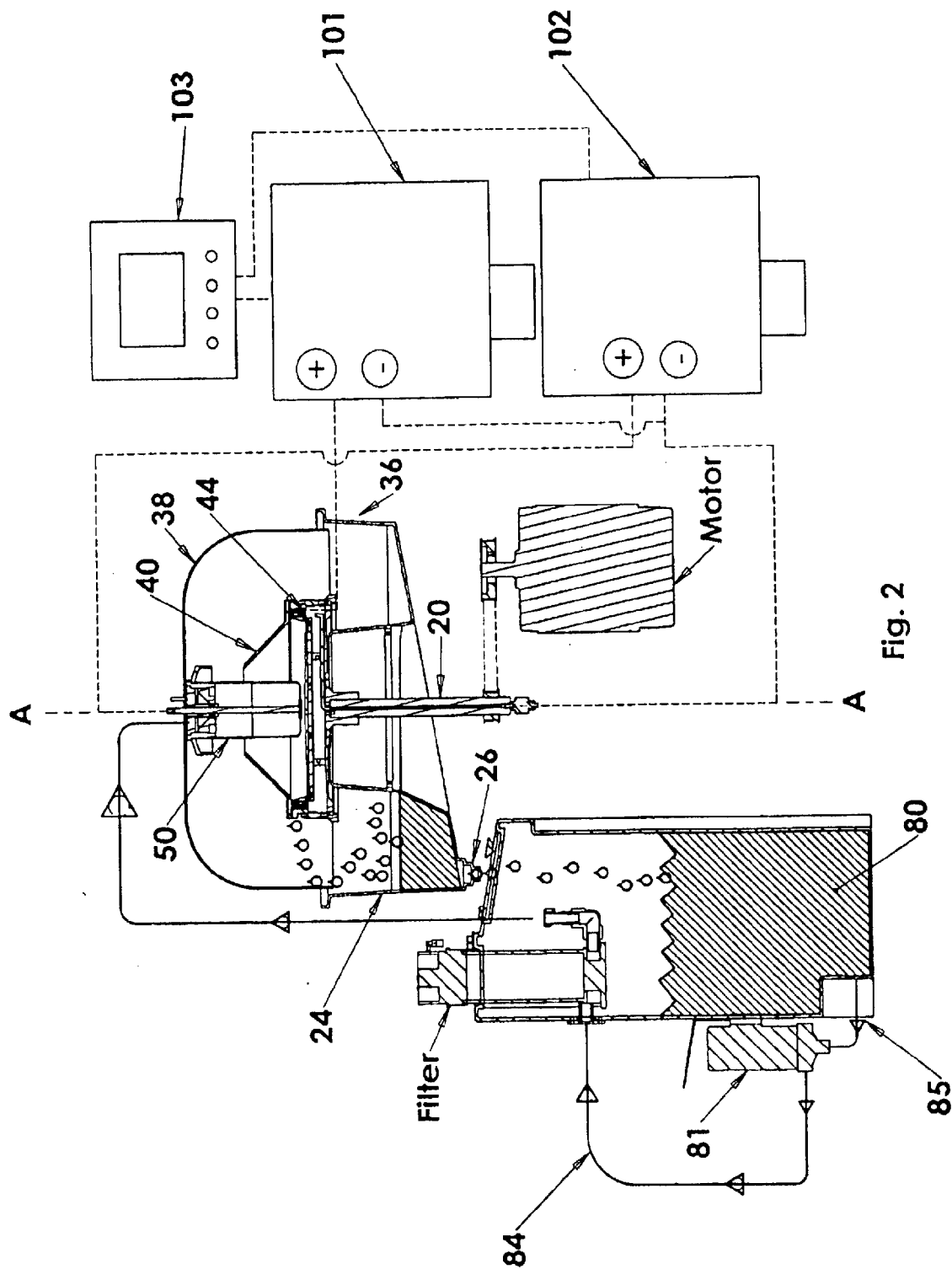
FIG. 2 is a schematic side sectional view of an overall system according to the invention, showing the anode in the "down position" within the cell.

FIGS. 1–2 show the complete scheme of the invention. The apparatus includes the ability to carry out multiple chemical processes and that is facilitated by having anode tools and wrench tools that can drop in and out of the cell, so the apparatus is essentially an open overflowing cell. This permits the chemistries to be purged through the cell to prepare the cell to receive the next chemistry. The drain basin can be addressed to return to a multitude of reservoir tanks so that the user can either carry out preplate, like an acid dip for removing an oxide layer on a the substrate powders, or other pretreatment to clean or to reduce the surface tension of the substrate powders to make them more wettable. Any of the enhancements that preplate processes are known for could be applied in this system followed by the post-electrodeposition schemes which would include rinsing, and neutralization or some type of an anti-tarnish agent.

Figure 3:
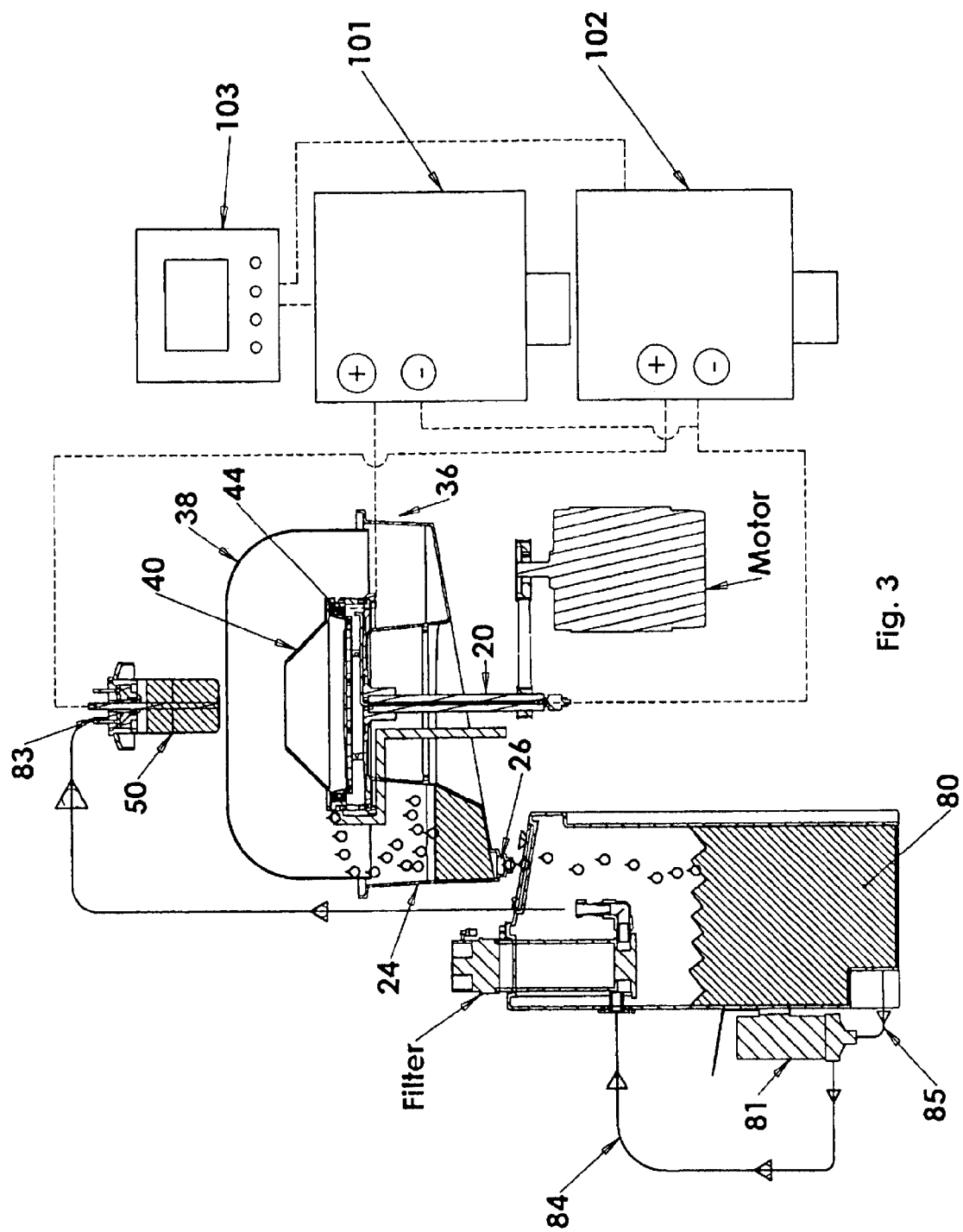
FIG. 3 is a schematic side sectional view of an overall system according to the invention, showing the anode and feed nozzle assemblies in the raised position, withdrawn from the electrolytic cell bowl assembly.

Another aspect of the embodiment of FIG. 2 and in FIG. 3 is that the computer control system carries out the sequencing and the phasing of the switching of the electromagnetic power source, if it is used with electromagnets, or the cathode power source which is supplied to the cathode ring 44 (which could also be configured as the opposing electrode for anodic processing). The invention will handle either the cathodic orientation or a anodic orientation on the cathode ring 44. So the ability to computer control all of the sequences of this process step boosts the efficiency of this cell to viable commercial application. The computer control can be a time-way that is controlled by programmable logic control.

Combined reference is made to FIGS. 1 and 2. Shown therein are the control elements of the invention, including an electromagnetic power source 101 and a cathode power source 102, both of which may be controllably operated by a control panel 103. The control panel 103 may be either manually operated, computer operated, or both, or various combinations of the two. It is within the skill of an ordinary software engineer to device a computer program that permits most of the operations of the invention, in various different electrodeposition applications, to be largely automated through computer control. Notable, of course, in most applications, the electromagnet 100 is turned off during the activation of the cathode to perform the selected electrochemical process, and visa-versa, e.g., in most (but not necessarily all) methods of the invention, when the electromagnet 100 is active, the cathode 44 is deactivated. (When the apparatus is entirely at rest and not in use, of course, all electrical systems are turned off.)

Figure 4:
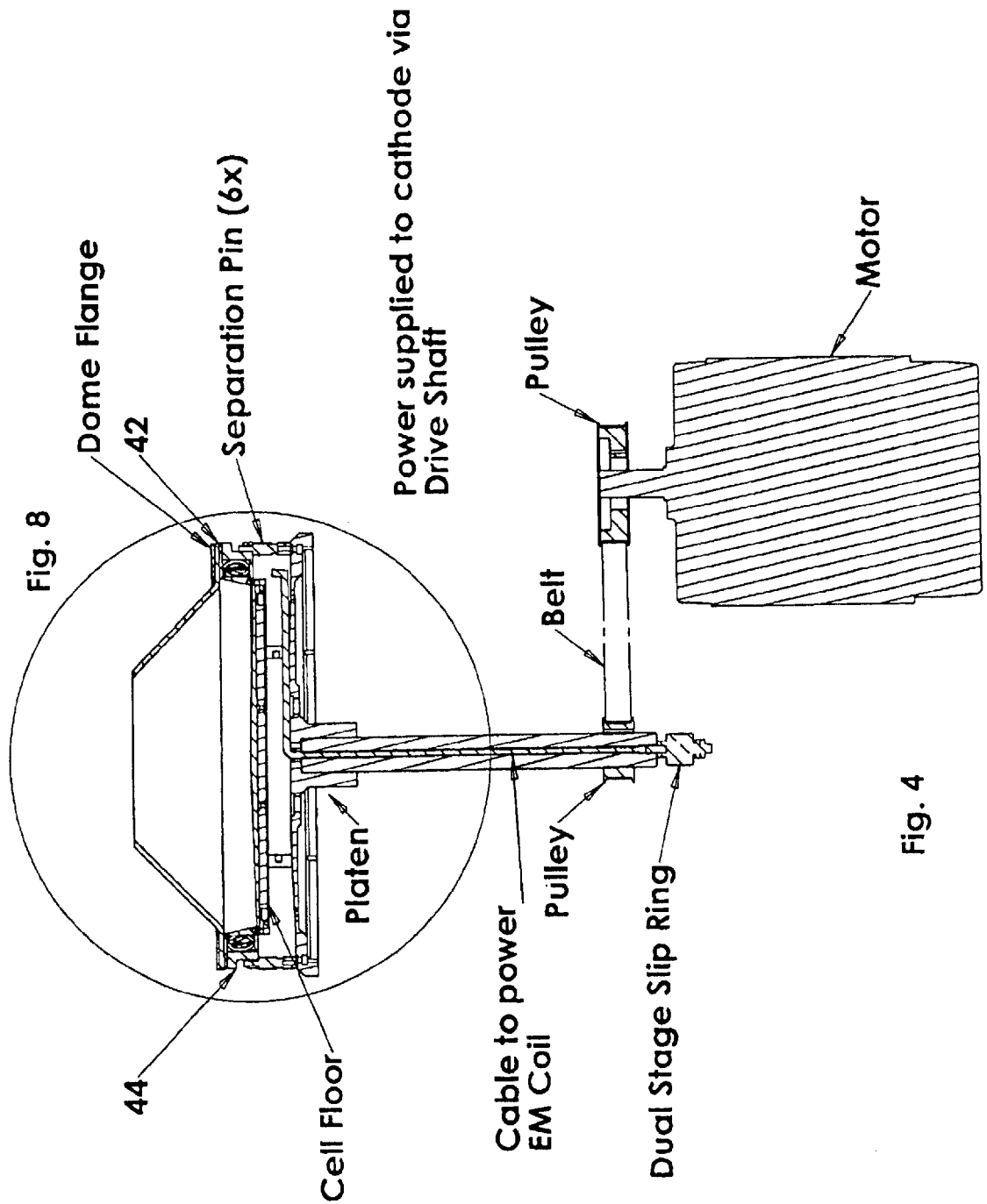
FIG. 4 is an enlarged side sectional view of certain components of the apparatus of the present invention as seen in FIG. 3.
Figure 8:
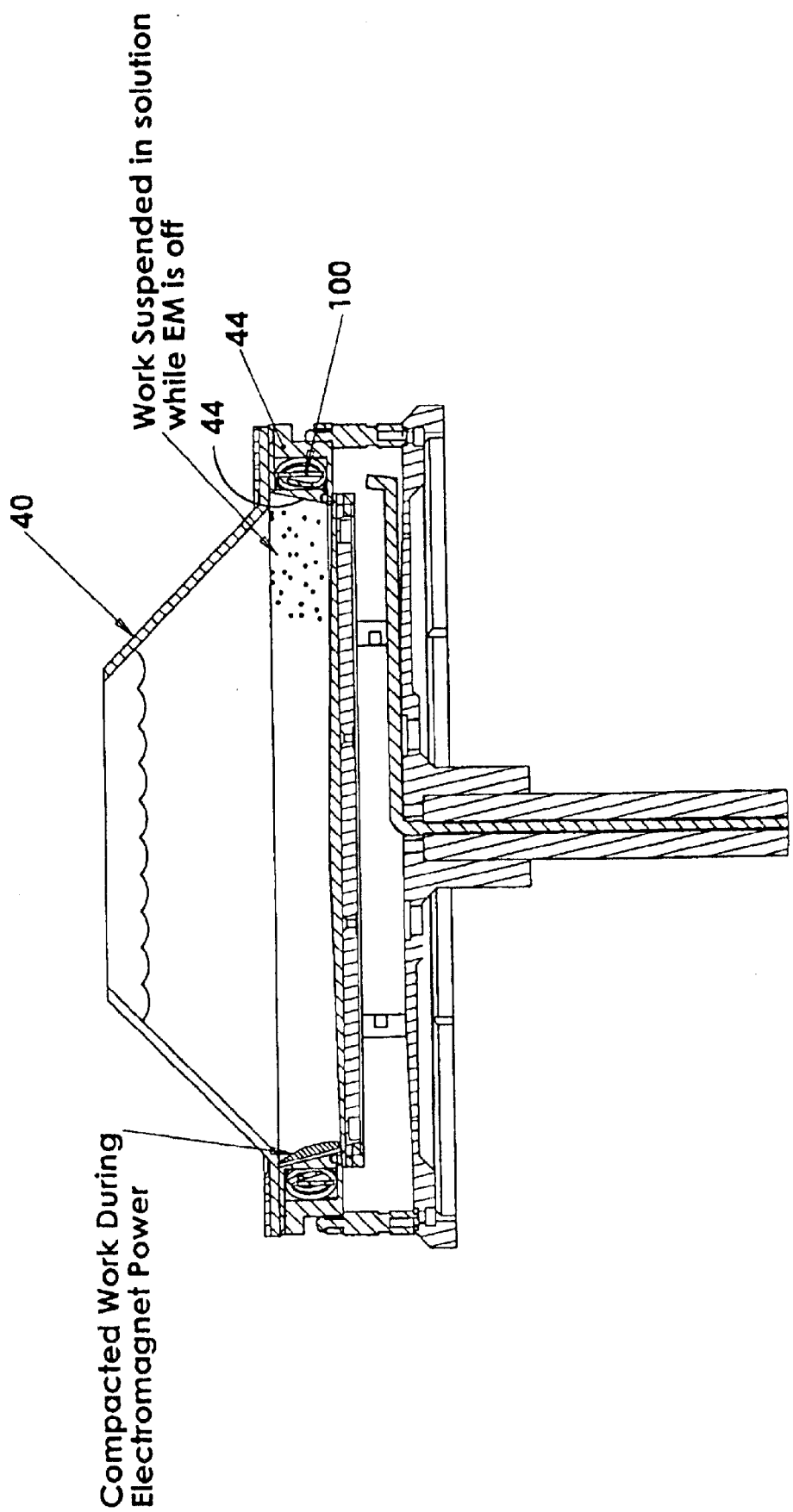
FIG. 8 is a side view of the bowl vessel, annular cathode, and embedded electromagnetic filed coil elements of the invention, showing on the left side of the figure how the substrate material is drawn to the cathode by the force of the electromagnetic coil when the coil is on, and showing on the right side of the figure how the substrate material is in suspension when the coil is turned off.
Figure 9:
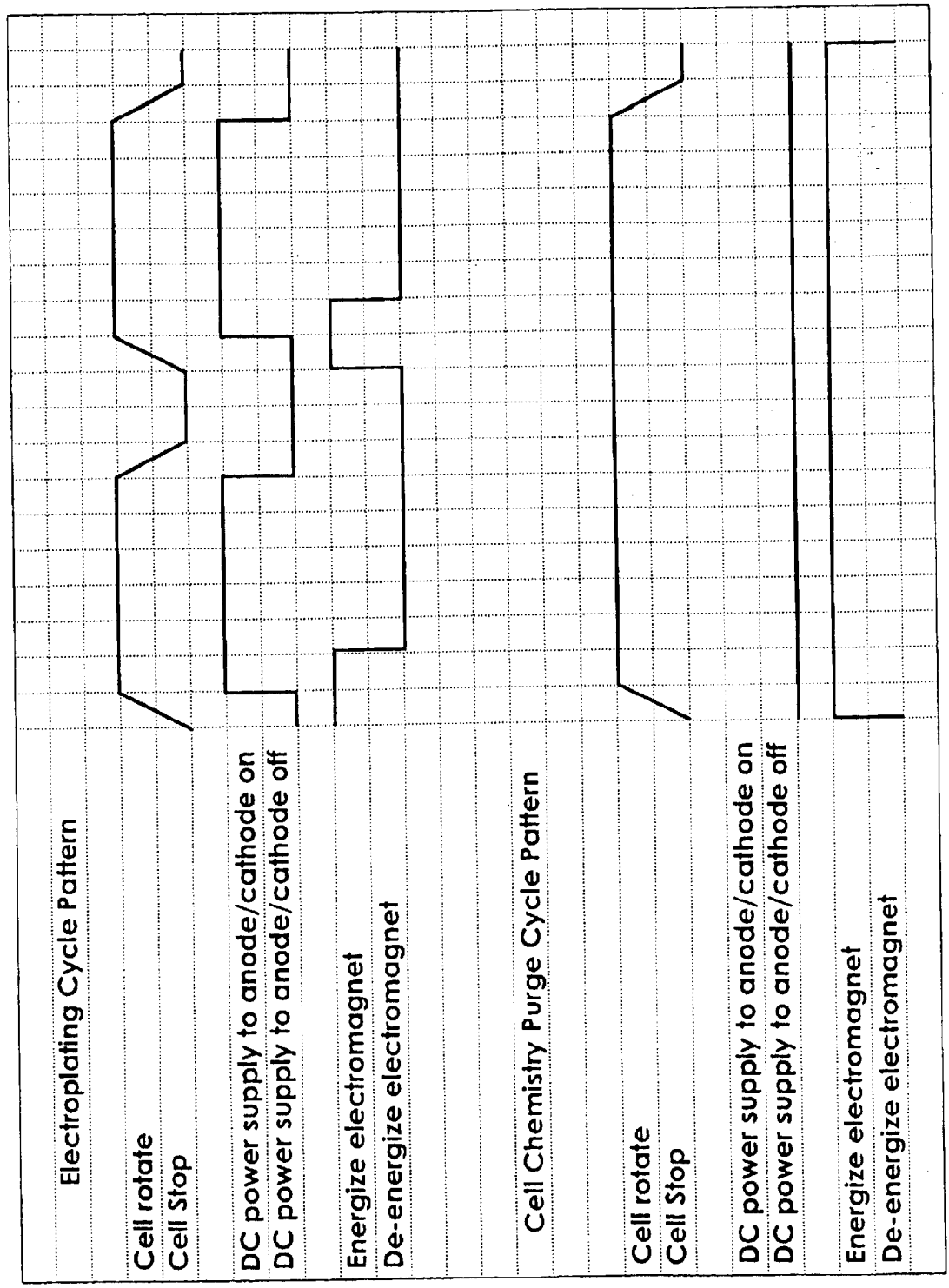
FIG. 9 is a time-way diagram illustrating a sequence of on/off events for the process cycle during both the electrodeposition process and the chemical change sequence according to the invention.

The bowl assembly 36 is situated to be rotated by the action of the drive shaft 20. Reference is made to FIGS. 4 and 8, which provide further detail of the bowl assembly 36. The bowl assembly 36 includes a rigid, durable bowl 70 in the shape of a truncated cone, having a generally disk-shaped planar floor 71 integrally molded with a frustum-shaped wall 72. Depending downward and radially outward from the wall 72, and preferably integrally molded therewith, is a bowl skirt 73. The entire bowl 70, including the floor 71 and skirt 73, preferably is molded from a suitable inert material, preferably a plastic such as a thermoplastic, or alternatively may be of copolymers, fiberglass or fiber composite.

Figure 5:
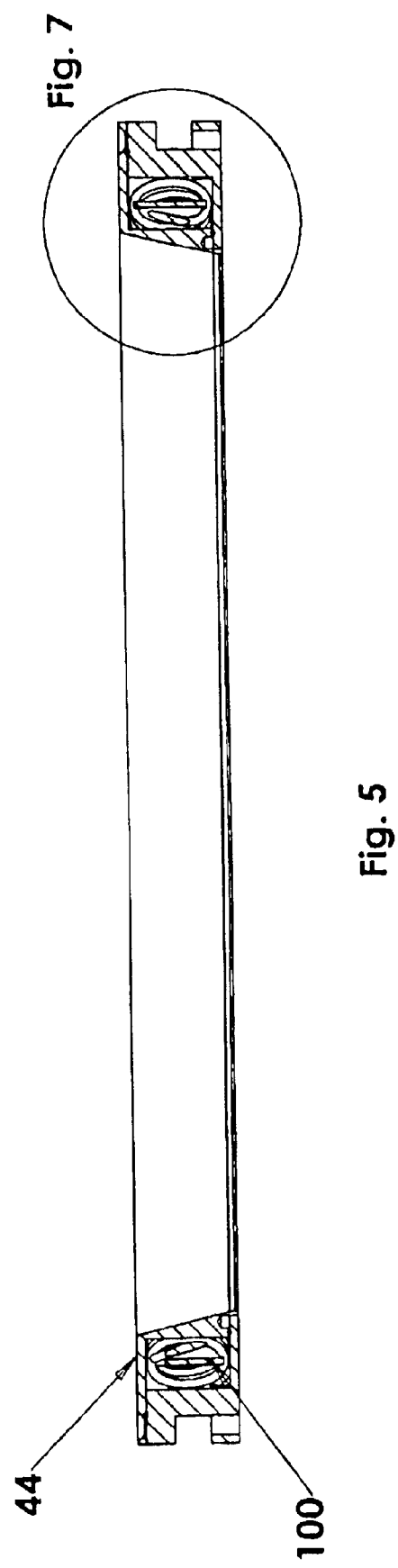
FIG. 5 is an enlarged side sectional view of the annular electrode component of the invention with a torroidal electromagnet coil disposed therein.
Figure 6:
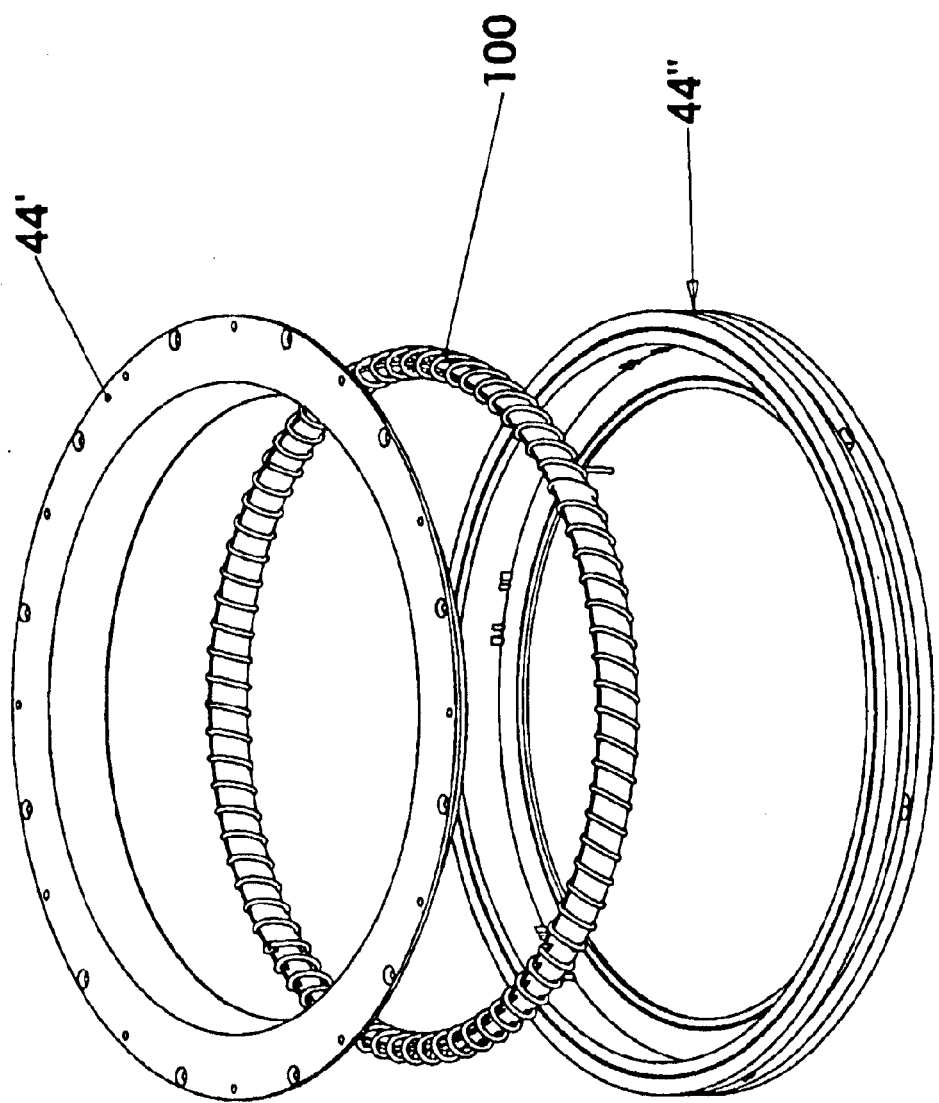
FIG. 6 is an isolated, perspective, blown-apart view of the main elements of the annular electrode and imbedded electromagnetic field coil according to the present invention
Figure 7:
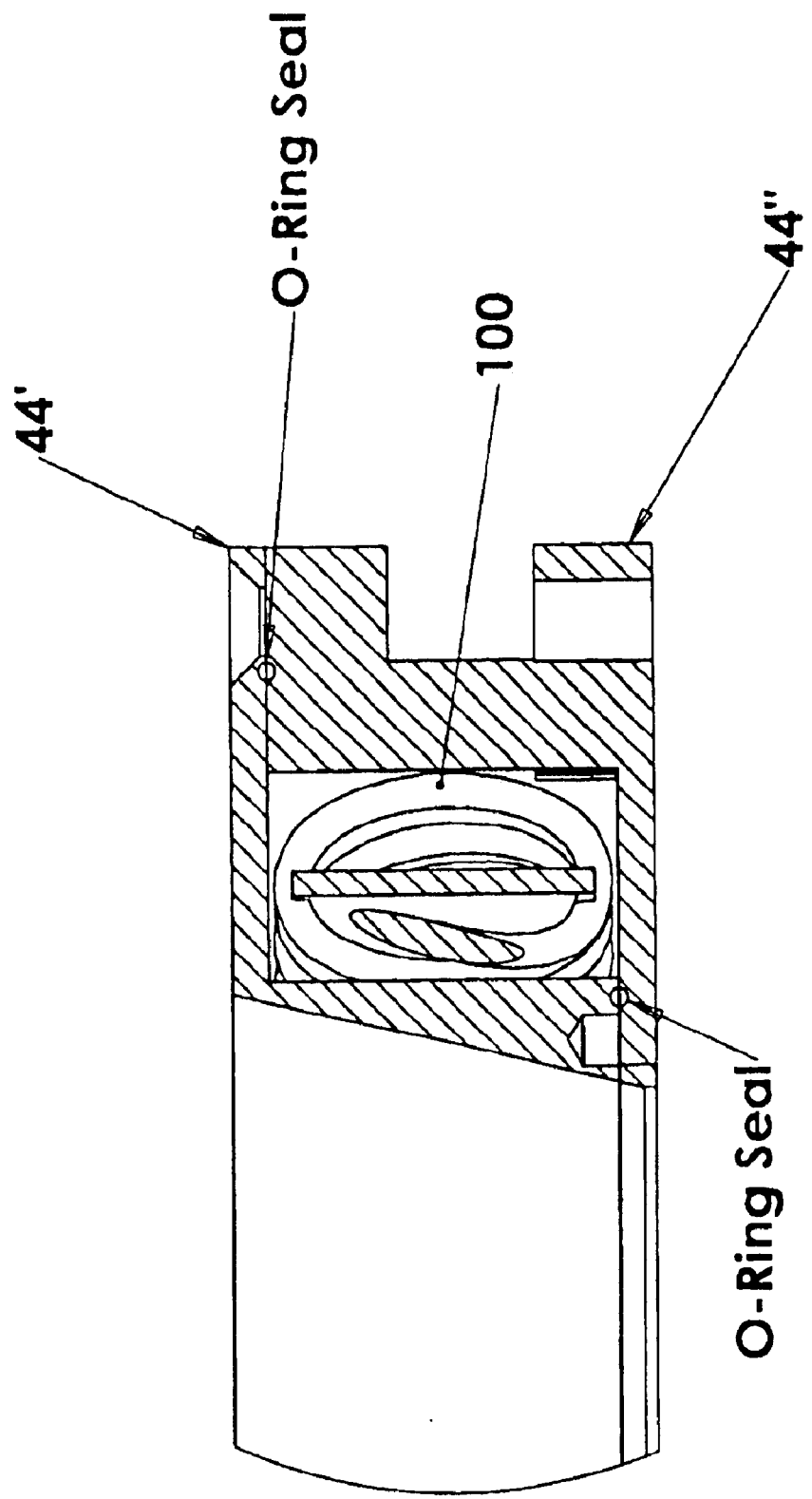
FIG. 7 is an enlarged side sectional view of the cathode and electromagnetic field coil elements of the invention shown in FIG. 5.

Continued reference is made to FIGS. 4 and 8, and added reference is made to FIGS. 5–7 illustrating that the bowl 70 has in the interior surface of the wall 72 thereof an annular cathode 44. Referring particularly to FIG. 6, it is seen that the cathode 44 preferably is assembled from to parts, a top cathode 44' and a bottom cathode 44", which are adapted to be brought into concentric registration to define the complete cathode 44. As indicated by FIG. 6, the upper cathode 44' and the lower cathode 44" when combined into registry (see FIGS. 5 and 7) define an annular interior space there between in which is disposed a magnet 100, electromagnet, or magnetic array. Thus, the magnet 100 is generally annular in the preferred embodiment, although in alternative embodiments the magnet 100 is fashioned from specific radially arrayed groups of magnets. In the preferred embodiment depicted in the drawing figures, the magnet 100 is a generally toroidal coil, which when conducting electricity functions as an electromagnet. When activated, the electromagnet generates a significant magnetic flux, the field of which extends a considerable distance, such that substrate particles in the bowl 70 are affected thereby. In alternative embodiments, the magnet 100 may be a plurality of electromagnetic coils, or a plurality of permanent magnets, disposed in selected radial arrays around the axis A of the bowl 70. In any embodiment, the magnetic flux from the magnet 100 is sufficient to cause substrate material particles in suspension in the electrolytic fluid to be drawn by magnetic force—even from areas near axis A—toward the cathode 44. By this innovation, even nano-sized particles, which ordinarily would remain in suspension for unduly extended periods of time if acted upon only by centrifugal force, can be quickly drawn to the cathode 44.

FIG. 8 is a side sectional view of the assembled electrolytic cell of the preferred embodiment of the invention. The bowl 70 includes the annular cathode 44 within the bowl wall 72. The dome 40 is removably mounted concentrically upon the bowl 70 by temporarily securing the rim flange 99 of the dome to the upper rim 77 of the bowl wall 72, as by bolts or the like, but with the filter 42 sandwiched therebetween. The cell is rotatably coupled to the shaft 20 according to convention, so as to rotate concentrically about axis A.

FIG. 8 depicts the apparatus with the electromagnet 100 turned off, and on the right side of the figure the substrate material particles are floating out in the electrolytic liquid. On the left side of the figure, the energization of the magnet 100 results in the substrate work being compacted up against the cathode. FIG. 8 also depicts the electrolytic liquid level.

A key advantage of the present invention thus is presented. The electrolytic cell (mainly including the bowl assembly 36) containing the electroplating solution and the substrate material undergoes rotation, wherein the cell rotates about its own axis A. As the cell orbits around the central axis A of the apparatus, the substrate material is cast by centrifugal force against the "outermost" portion of the interior of the bowl 70. As suggested by FIG. 8, during the "start" or rotational stage of the the centrifugal force due to rotation of the cell impels the substrate material within the bowl 70 to collect along the wall 72. During cell rotation, species from the solution is electrolytically deposited upon the substrate material; however, especially in the case of fine powders, a substantial portion of the substrate material remains in suspension, due to its low mass/particle ratio. The forgoing is largely in accordance with known technologies. However, in the invention, during the "stop" stage, when rotation of the cell is ceased (as a step associated with the tumbling of the substrate material to promote even and efficient electrodeposition), the magnet 100 is controllably actuated to accelerate migration of the substrate material particles toward the cathode 44. An advantage of the invention therefore is that the substrate material to be treated tends to collect at a comparatively rapid rate, and in a manner to promote efficient electro processing thereof.

Thus, while cell rotation is repeatedly interrupted and re-started to tumble the substrate material, the "stop" periods are exploited to maximum effect by actuation of the magnet 100.

The mode of applying the working electrical potential to the substrate is explained with combined reference to FIGS. 1–8, especially FIG. 4. Electricity at the user-selected and appropriate voltage and amperage is supplied from the dual stage slip ring 87 to the electrical cable 90. Current flows through the cable 90 to the electromagnet 100. Electrical potential is applied at controlled intermittent times to the cathode 44 via the shaft 20.

As previously mentioned, when rotation of the bowl assembly 36 is stopped, the substrate material beneficially tumbles or rolls along the inside of wall 72 due to inertial forces. Once the tumbling ceases (or at some other predetermined time), the cell rotation is re-started to again throw the substrate material to the electrode 44. So long as some portion of the collected substrate is in electrical contact with the annular cathode 44, the substrate undergoes electrolytic processing by the electrical current in the cathode.

The present invention utilizes a rotary cathode cell which has an annular cathode 44 which is fed by currents that come up through the shaft. During the process, the rotation of the cell is stopped and started to assist with tumbling the powders. The operating principle is distinguishable from known devices, however, in that there is additionally provided a magnet 100, preferably an electromagnet, that is either in toroidal coil form or a spool-type electromagnet, that is embedded into the cathode ring 44 itself, so that during the non-plating phase of the process, the electromagnetic field from the magnet is harnessed to draw the powered substrate material to the annular cathode 44 to further assist in more rapid clarification of the suspended particles to the cathode where the electrolytic process is carried out. The apparatus permits treatment of small particles which would include the submicron and nano scale ferrous powders, or nickel powder, or cobalt powders, or any other powder that exhibits a para-magnetic or magnetic capability for being drawn to the cathode.

Advantages offered are time, efficiency and that efficiency would be in terms of the electrical connectivity, but mostly in the ability to retain smaller particles. Applicants determined that in handling submicron structures, the density of that material will hold the particles in suspension beyond the efficiency range of any of the previous attempts in the art. A time-way diagram of the operation of the invention would show the phase of the cell rotating, which allows the particles to tumble, then the phase where the electromagnet is energized to draw the substrate powder to the cathode; the magnet 100 is then de-energized and then at that point, the substrate powders are affixed on the cathode 44 under centrifugal force and that allows the magnet to be switched off, and then sequentially the current is supplied to the cathode to carry out the electrolytic process.

By means of the control panel sequential switching of the energizing/de-energizing of the coil is accomplished. De-energization of the magnet 100 is normally done during the electrodeposition phase, because the linking of the particles under a magnetic field would be tight, which would promote undesirable bridging of the particles together or of undesirable agglomeration of particles. Thus, the inventive process using the rotary devices can be performed without agglomeration of the particles.

Nevertheless, the invention includes the ability to create electroformed films using the electromagnetic force, where the user preferentially energizes the electromagnet 100, affixes the powder to the cathode 44, continue the electromagnets' actuation through the plating phase, and end up with a north-south oriented field of substrate particles that would be standing off of the cathode face, perpendicular to the axis of rotation. Such application allows the electroformation of a foil, with the substrate particles standing in a preferred or an influenced orientation; that could generate an enhanced foil product, or the foil itself could be further processed by oxidizing or removing the substrate particles through etching, and ending up with a porous or spongy form that has a high-order arrangement of the particles now in an annular form. A benefit of using the magnetic field to orient or organize the magnetic particles in a bipole arrangement enhances the product foil for applications such as fuel cell membrane electrode assemblies and battery electrodes as well as flat panel display electrodes.

The primary contemplated use of the invention would be for the electro processing of metallic powders that exhibit a magnetic attraction. When powders become finely divided, powders that exhibit paramagnetic or ferramagnetic qualities, which would have very low magnetic attractability in their smaller divided state, the smaller division would be enough to make it mobile, and attractive to the magnetic force. Thus, there are materials other than ferrous powders and nickels and cobalts (those that typically in bulk form exhibit a strong magnetic attraction) that can be electroprocessed by the invention.

Other embodiments include use of permanent magnets. In such case, the electronic control systems and the switching of an electromagnet power source are not necessary. In a more passive scheme, there is preferably an array of permanent magnets that are encapsulated, such as a neodymium magnet, that have a magnetic field. This array of magnets is around of the periphery of the rotating cell. The magnets themselves are fixed in positions that are preferably equidistant from each other. If there were four, they would have a north-south, east-west orientation of the magnets. As the substrate powder is being rotated and as it moves into a stronger field of the power, it is attracted to the cathode, and as the cathode continues to rotate, it creates more gap distance and magnetic flux would drop, so then the powder is released and at that point experiences a tumbling action that contributes to electrodeposition without agglomeration.

During electrodeposition of magnetic powders such as nickel, their position against the rotating cathode can be altered by placing stationary magnets exterior to the cell. As the powders pass the magnetic flux, their position against the cathode will change slightly as they are temporarily aligned with the passing flux. The magnets can be placed at various planes relative to the plane of the cell floor, thereby providing additional powder alignments. When the cell is cycled, the magnetic fields can be removed in order for the powders to change position against the cathode.

In yet another alternative embodiment, the cell is provided with a magnetic floor. Such a system preferably has an entire floor that is magnetic. This embodiment has a high exposure of the mechanical cathode area. The cathode efficiency on the work itself would be very low because the process deposits preferentially to the equipment. In this configuration, a shallow rotating tray with a cathodic cell floor is employed. Magnetic fields can also be placed below the cell floor in order to temporarily alter the position of magnetic powders, thereby increasing exposure to the anode placed on the solution surface. The solution flow is laminar, with the inlet preferably placed at the center of the rotating floor. The solution and the powders are circulated as they both spill over the outside edge of the rotating cell. The powders will have many opportunities to achieve contact with the cell floor cathode. While the powders are in the sump, they can be de-agglomerated by being subjected to turbulent solution flow prior to being pumped back to the electrodeposition cell.

In order to have the highest efficiency, the electromagnet 100 preferably includes a soft iron core. The soft iron core is the softest magnet material that is practically available and that will allow that when the current is switched on and off for the electromagnet, there will be minimal residual magnetivity in the core. The cathode 44 preferably is made from of stainless steel. There will be some magnetization of the cathode, but the inertia of the solution overcomes the magnetic attraction between the substrate particles which will become magnetized, and any residual magnetivity that could be retained in the stainless steel cathode. Using the range of kinetics that are available, and in speed parameters, and the starting and stopping acceleration curves, the apparatus overcomes any residual magnetic effects. Particle-to-particle linking will be the case. However, according to some base experimentation, just observations of how particles are behaving in liquid forms, and the particles seem to be breaking up.

Another aspect of the inventive cell is that it permits the processing of materials that are diamagnetic, in other words, those that exhibit no attraction (their lattice form does not allow them to polarize to either cathode). (Paramagnetics will attract preferentially to the north or the south.) There are elements that have diamagnetic properties such as bismuth that have a diamagnetic attraction that is actually repelled by both poles, and one can according to the invention perform some preferential treatments on larger scale particles, where the current is pulsed on and the diamagnetic repulsion of the particles aids in a process arrangement of that nature. In that embodiment, the cell rotation would be operated on a continuous basis, and the switching of the electromagnet would be the mechanism for tumbling the powders and breaking them up to prevent agglomeration and to get dispersion of the deposit layer over the whole particle.

Although the invention has been described in detail with particular reference to these preferred embodiments, other embodiments can achieve the same results. Variations and modifications of the present invention will be obvious to those skilled in the art and it is intended to cover all such modifications and equivalents. The entire disclosures of all patents and publications cited above, are hereby incorporated by reference.

What is claimed is:

1. An electrodeposition system comprising:

a rotary flow-through cell for holding electrolytic fluid and substrate material particles;

an electrode; and one or more magnets or electromagnets for drawing substrate material particles in the cell against the electrode.

2. The system of claim 1 wherein said electrode is annular.

3. The system of claim 2 wherein said one or more magnets comprises an electromagnet.

4. The system of claim 3 wherein said electromagnet is disposed within said electrode.

5. The system of claim 3 wherein said electromagnet comprises an electromagnetic coil.

6. The system of claim 2 wherein said one or more magnets comprises an array of magnets spaced equidistantly from one another.

7. The system of claim 1 additionally comprising control means for selectively turning on and off said one or more magnets in sequence with other mechanical operations of the cell.

8. The system of claim 7 wherein said control means turns on said one or more magnets when said electrode is off.

9. The system of claim 1 wherein said system operates to draw substrate material nanoparticles in the cell against the electrode, which nanoparticles would otherwise remain in suspension in the electrolytic fluid in the cell.

10. An electrodeposition method comprising the steps of:

providing to a rotary flow-through cell electrolytic fluid and substrate material particles;

employing an electrode; and via one or more magnets or electromagnets, drawing substrate material particles in the cell against the electrode.

11. The method of claim 10 wherein in the employing step the electrode is annular.

12. The method of claim 11 wherein in the drawing step the one or more magnets comprises an electromagnet.

13. The method of claim 12 wherein in the drawing step the electromagnet is disposed within the electrode.

14. The method of claim 12 wherein in the drawing step the electromagnet comprises an electromagnetic coil.

15. The method of claim 11 wherein in the drawing step the one or more magnets comprises an array of magnets spaced equidistantly from one another.

16. The method of claim 10 additionally comprising the step of selectively turning on and off the one or more magnets in sequence with other mechanical operations of the cell.

17. The method of claim 16 wherein control means turns on the one or more magnets when the electrode is off.

18. The method of claim 10 wherein the method operates to draw substrate material nanoparticles in the cell against the electrode, which nanoparticles would otherwise remain in suspension.

* * * * *

UNITED STATES PATENT AND TRADEMARK OFFICE
CERTIFICATE OF CORRECTION

PATENT NO. : 6,890,412 B2 Page 1 of 1
APPLICATION NO. : 10/228709
DATED : May 10, 2005
INVENTOR(S) : Thomas P. Griego, John W. Wichman, III and Geronimo Velasquez It is certified that error appears in the above-identified patent and that said Letters Patent is hereby corrected as shown below:

Column 1, Lines 8-11, please delete entire paragraph.

This application is a continuation of international application
No. PCT/EP01/01129 filed on Feb. 2, 2001, which claims priority
of German patent application No. 100 05 195 filed on Feb. 5, 2000.

Signed and Sealed this

Eighth Day of July, 2008

JON W. DUDAS
*Director of the United States Patent and Trademark Office*